(12) United States Patent
Rhodes et al.

(10) Patent No.: US 7,066,519 B2
(45) Date of Patent: Jun. 27, 2006

(54) ARTICULATED BASE WITH GUIDE TRACK FOR FOLD-IN-FLOOR VEHICLE SEAT

(75) Inventors: Louis A Rhodes, Farmington Hills, MI (US); Douglas J Quigley, Rochester, MI (US); Joseph L Salani, Oxford, MI (US); Carl Mather, Lake Orion, MI (US); John V Keane, Auburn Hills, MI (US); David J Ewers, Leonard, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/174,923

(22) Filed: Jul. 5, 2005

(65) Prior Publication Data

US 2005/0264067 A1 Dec. 1, 2005

Related U.S. Application Data

(62) Division of application No. 10/647,631, filed on Aug. 25, 2003, now Pat. No. 6,932,424.

(60) Provisional application No. 60/405,453, filed on Aug. 23, 2002.

(51) Int. Cl.
*B60N 3/12* (2006.01)
(52) U.S. Cl. .................. 296/37.14; 296/66; 297/15
(58) Field of Classification Search ............. 296/37.2, 296/37.15, 37.14, 66, 69, 65.01, 65.05; 297/15, 297/331, 334
See application file for complete search history.

(56) References Cited

U.S. PATENT DOCUMENTS

| 1,887,947 | A | * | 11/1932 | Savale | 296/66 |
| 3,202,453 | A | * | 8/1965 | Richards | 296/66 |
| 3,227,488 | A | * | 1/1966 | Kosbab et al. | 296/66 |
| 6,626,481 | B1 | * | 9/2003 | Kawasaki | 296/65.05 |
| 6,962,384 | B1 | * | 11/2005 | Rhodes et al. | 296/66 |

* cited by examiner

*Primary Examiner*—Jason Morrow

(74) *Attorney, Agent, or Firm*—Ralph E. Smith

(57) ABSTRACT

A fold-in-floor vehicle seat is supported in a use position on a generally flat load floor. To move the seat into a storage position, the seat is lowered onto a portion of the load floor that acts as an articulated base for the seat. The base approximates the footprint of the seat, and covers a storage cavity directly below the seat and configured to closely receive the seat. The base is free floating with respect to the remainder of the load floor, but is pivotally connected to the vehicle by an articulating arm that allows the base to rotate about a pivot point through an arcuate section of guide track in the storage cavity, and the arm then articulates to allow the base to travel through a straight portion of track. The arm then returns to its starting position as the base traverses a second arcuate section of track, having now inverted so that the seat is lodged within the storage cavity.

7 Claims, 5 Drawing Sheets

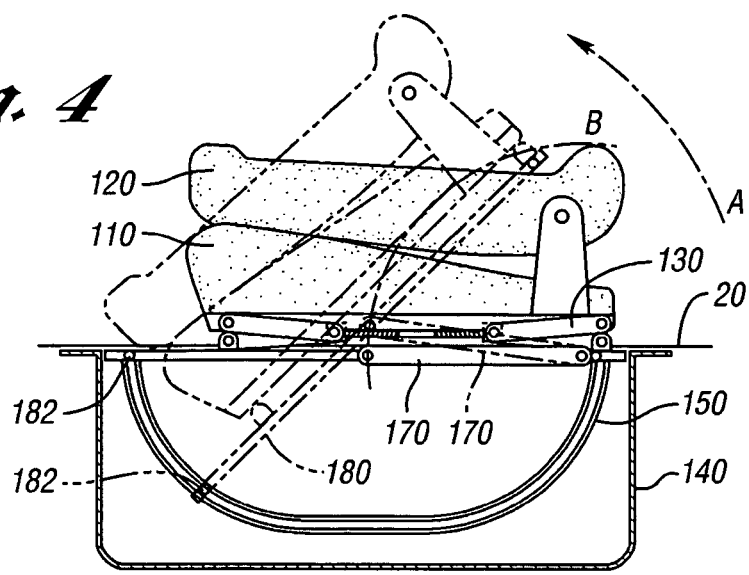
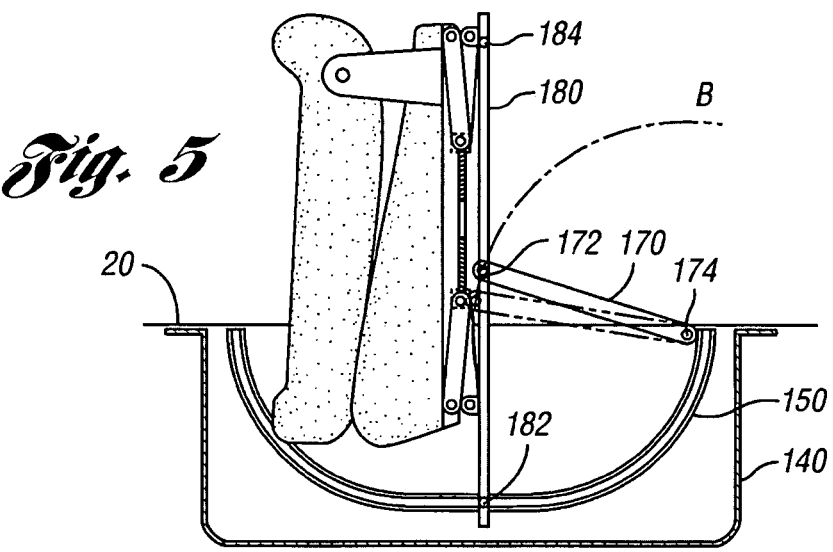
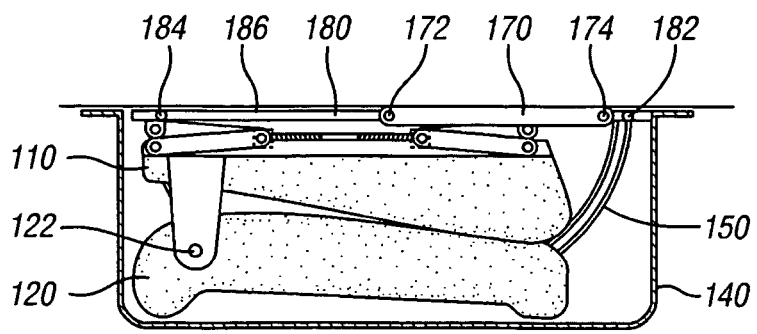

US 7,066,519 B2

ARTICULATED BASE WITH GUIDE TRACK FOR FOLD-IN-FLOOR VEHICLE SEAT

CROSS-REFERENCE TO RELATED APPLICATIONS

This is a divisional of application Ser. No. 10/647,631, filed Aug. 25, 2003, now U.S. Pat. No. 6,932,424, issued Aug. 23, 2005, which claims the benefit of Provisional Application Ser. No. 60/405,453, filed Aug. 23, 2002, entitled "Fold-in Floor Vehicle Seat Arrangements."

BACKGROUND OF THE INVENTION

1. Field of the Invention

The invention relates to automobile seating components, and more specifically to automobile seating components adapted to fold and store in an in-floor storage receptacle.

2. Description of Related Art

Automobiles with folding or removable seats are well known in the art. The purpose of such seats is to adapt the automobile to multiple functions, such as carrying passengers or carrying cargo. Each of these methods of adapting the automobile has had its respective advantages and disadvantages. For instance, a folding seat can require minimal actions on the part of the user, but afford only a partial use of available vehicle volume for cargo. The cargo volume may also be uneven, providing an irregular load floor. The removable seat maximizes the availability of cargo volume, but requires much greater effort on the part of the user to physically remove the seat, and requires that the removed seat be stored outside the vehicle. The seat may thus not be available for conversion back to passenger-carrying away from the seat storage location.

It would be advantageous to provide a seat which incorporates the convenience of a folding seat with the maximization of uniform cargo volume of the removable seat.

BRIEF SUMMARY OF THE INVENTION

A fold-in-floor vehicle seat is supported in a use position on a generally flat load floor. To move the seat into a storage position, the seat is lowered onto a portion of the load floor that acts as an articulated base for the seat. The base approximates the footprint of the seat, and covers a storage cavity directly below the seat and configured to closely receive the seat. The base is free floating with respect to the remainder of the load floor, but is pivotally connected to the vehicle by an articulating arm that allows the base to rotate about a floating pivot point through an irregular guide track in the storage cavity. The arm returns to its starting position as the base traverses the track and inverts so that the seat is lodged within the storage cavity and an underside of the base presents a new load floor.

BRIEF DESCRIPTION OF THE SEVERAL VIEWS OF THE DRAWINGS

The present invention will become more fully understood from the detailed description and the accompanying drawings, wherein:

FIG. 4 is the side view of FIG. 2, with the vehicle seat in a collapsed position, and the assembly partially rotated toward a storage position in phantom.

FIG. 5 is the side view of FIGS. 2 and 4, with the assembly further rotated toward the storage position.

FIG. 6 is the side view of FIGS. 2, 4 and 5, with the assembly in the storage position.

DETAILED DESCRIPTION OF THE INVENTION

Figure 1:
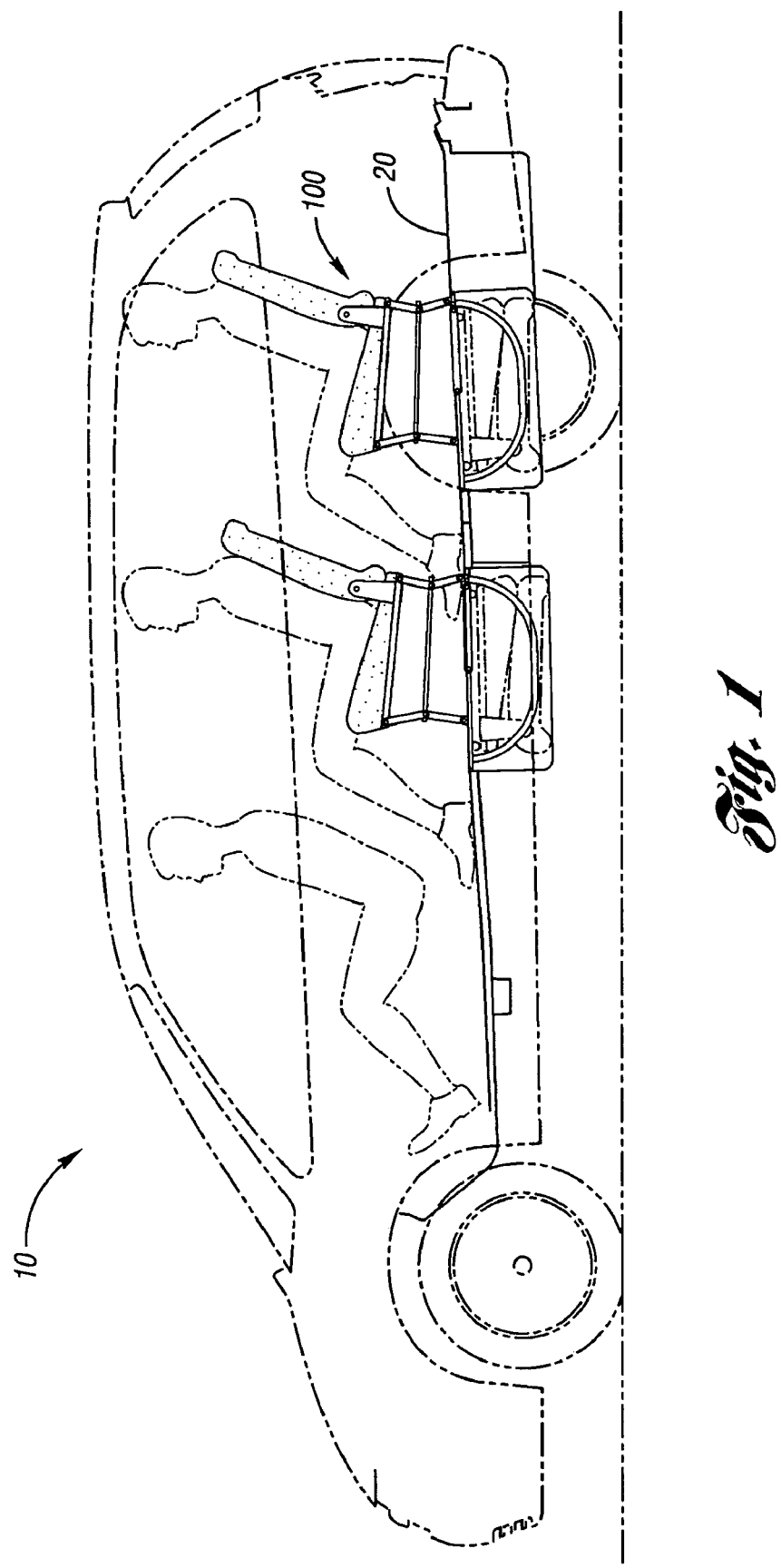
FIG. 1 is a side view of a vehicle incorporating an assembly comprising an articulated base with guide track for fold-in-floor vehicle seats according to the invention.

Referring to FIG. 1, an automobile 10 includes an interior load floor 20, and incorporates an assembly 100 comprising a fold-in floor vehicle seat with articulated base and guide track according to the invention. In the illustration of FIG. 1, two rows each containing at least one assembly 100 of fold-in floor vehicle seats are incorporated into the vehicle 10.

Figure 2:
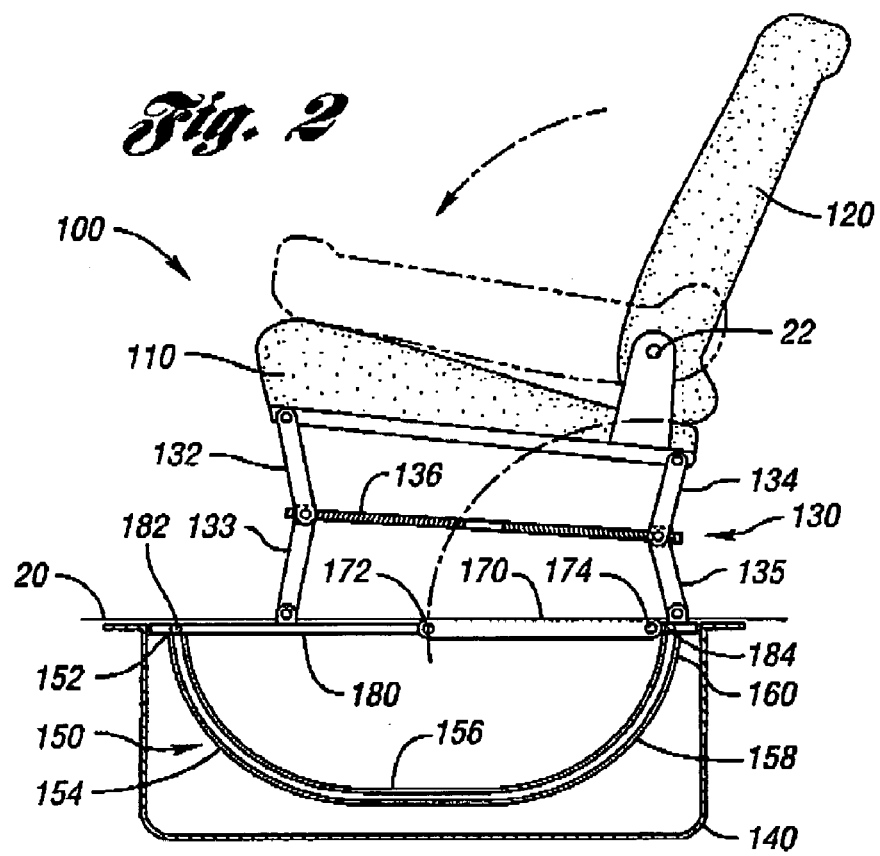
FIG. 2 is an enlarged side view of the articulated base with guide track for fold-in-floor vehicle seats of FIG. 1, with the vehicle seat in a seating position, and with the seat back in a folded position in phantom.

Beginning with the enlarged view of FIG. 2, seat assembly 100 comprises a seat cushion 110, seat back 120, leg assembly 130, storage receptacle 140 and articulated base 180. Seat back 120 is pivotally attached to seat cushion 110 at pivot point 22. Seat back 120 is pivotable from an extended position shown in FIG. 2 to a collapsed position shown in FIG. 2 in phantom.

Figure 3:
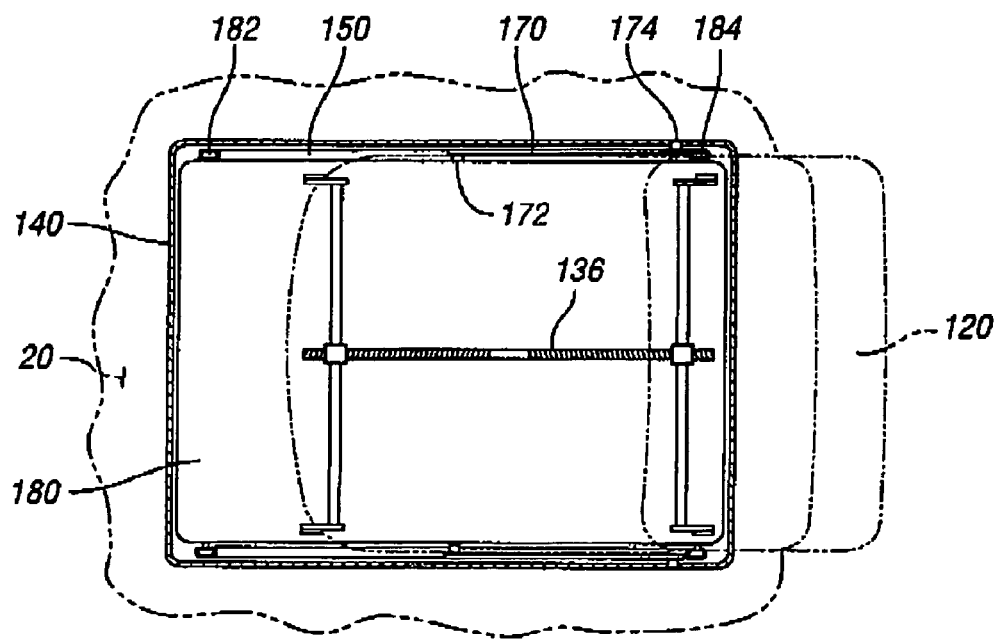
FIG. 3 is a plan view of the invention of FIG. 2.
Figure 7:
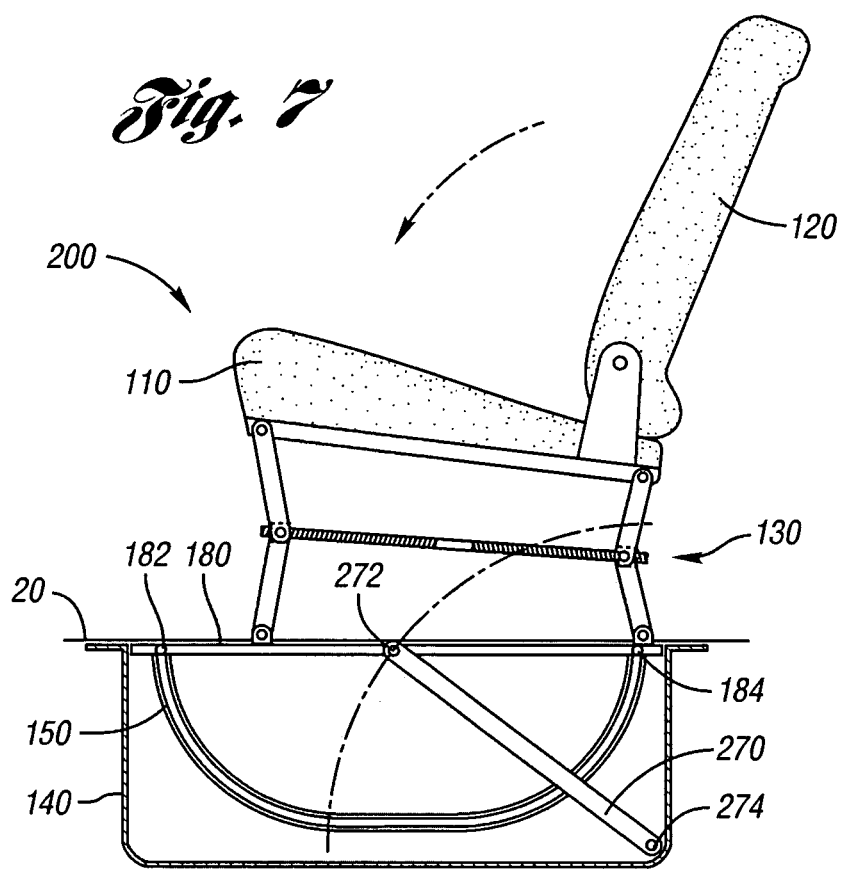
FIG. 7 is an enlarged side view of a further embodiment of the invention.

With further reference to FIGS. 2–3, leg assembly 130 comprises upper front legs 132 pivotally connected to lower front legs 133, and upper rear legs 134 pivotally connected to lower rear legs 135. Each of the front and rear lower legs 133, 135 are further pivotally connected to articulated base 180. Front legs 132, 133 are operably connected to rear legs 134, 135 by screw drive 136. Screw drive 136 is an example of a mechanism for lowering seat cushion 110 from the extended position shown in FIGS. 1–2 and the collapsed position shown in FIGS. 4–6.

Articulated base 180 is operably connected to vehicle 10 through a plurality of pins/rollers 182, 184 engaging guide track 150. Guide track 150 is fixedly mounted within storage receptacle 140 which is mounted to vehicle 10. Articulated base 180 is further connected to storage receptacle 140, and relative to guide track 150, through articulating arm 170. Arm 170 is pivotally mounted to storage receptacle 140 at fixed pivot 174, and is pivotally mounted to articulated base 180 at floating pivot 172.

As shown in FIG. 2, guide track 150 is comprised of a first semi-circular segment 154, a straight segment 156, and a second semi-circular segment 158. A first end 152 of track 150 receives pin/roller 182 with the assembly 100 in the extended or use position shown in FIGS. 2–3. Second end 160 of track 150 receives pin/roller 184. Pins/rollers 182, 184 are adapted to align with and engage track 150 in the sense of a roller, but further incorporate a retractable pin portion for engaging apertures (not shown) in the track 150 for locking the assembly 100 in the use/extended position and in the storage position.

Referring now to FIG. 4, the assembly 100 is shown with the seat back 120 in a folded position against seat cushion 110, and leg assembly 130 in a collapsed position such that seat cushion 110 is collapsed down against articulated base 180. As shown in phantom in FIG. 4, the collapsed seat is adapted to be rotated with articulated base 180 in the direction indicated by arrow A. Pins 182, 184 must be released from track 150 for articulated base 180 to begin rotation about floating pivot 172.

As shown in FIGS. 4–5, as articulated base 180 is rotated and pin 182 passes along guide track 150, floating pivot 172 must move through arc B on articulated arm 170, in order to accommodate the non-circular nature of guide track 150 and keep a constant distance between floating pivot 172 and the location on guide track 150 of pin 182. Guide track 150 is shown as being formed with two semi-circular segments 154, 158 linked by straight segment 156, but the invention is not to be limited to this particular configuration, as the floating pivot 172 would function in a like manner with differently arranged guide tracks that display a constant to decreasing distance from the starting position of the floating pivot 172 (as found in FIG. 2) to the guide track 150.

Referring to FIG. 6, as the articulated base 180 is rotated 180 degrees, pins/rollers 182, 184 have switched places in guide track 150, and are in position to engage the apertures (not shown) to lock the base 180 in the inverted position. Folded seat cushion 110 and back 120 are fully housed in storage receptacle 140, and articulating arm 170 and floating pivot 172 have returned to their original positions. Articulated base 180 further includes a flat underside 186 that, with articulated base 180 inverted, forms a continuous surface with vehicle load floor 20.

FIGS. 7–11 discloses a further embodiment of an assembly 200 according to the invention. Like elements according to the assembly of FIGS. 1–6 are provided with like reference numerals.

Figure 8:
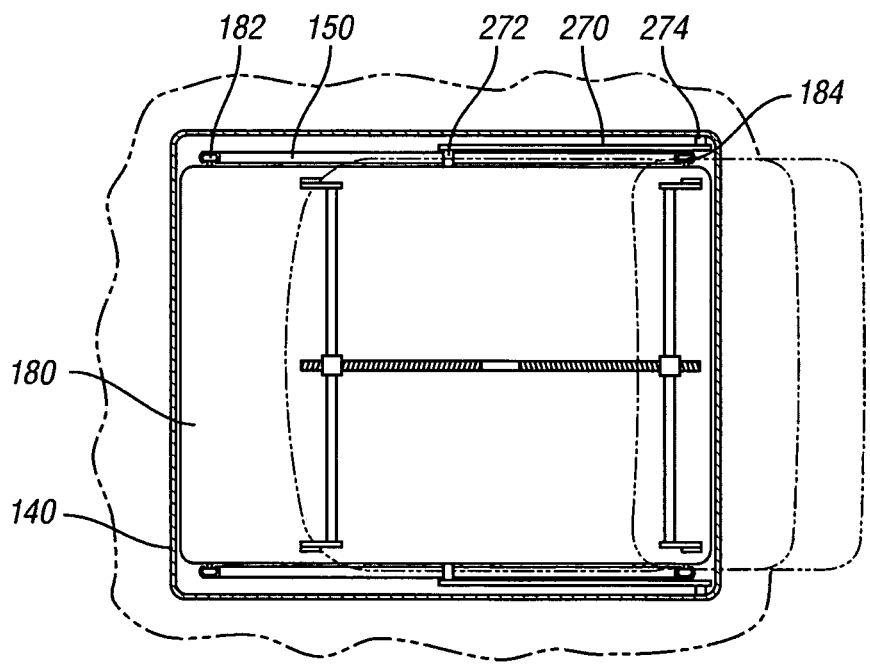
FIG. 8 is a plan view of the invention of FIG. 7.
Figure 9:
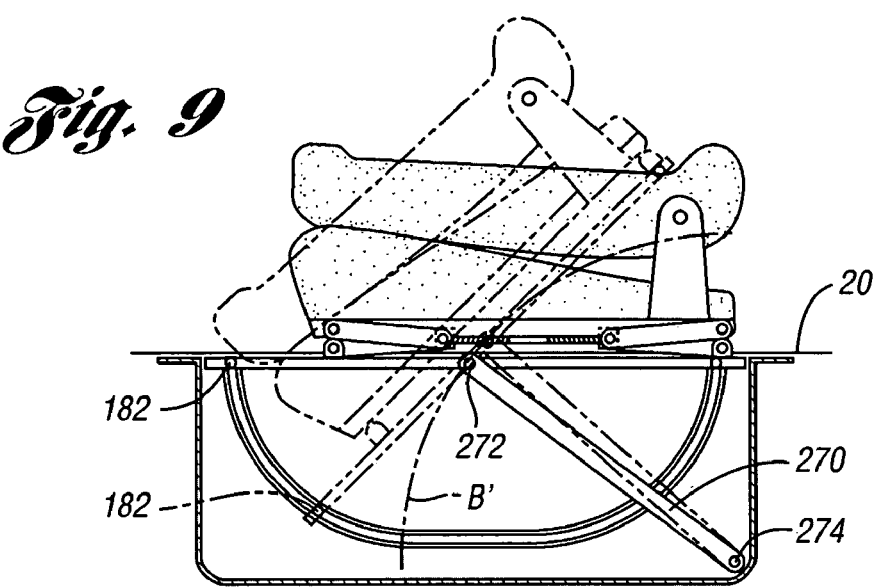
FIG. 9 is the side view of FIG. 7, with the vehicle seat in a collapsed position, and the assembly partially rotated toward a storage position in phantom.
Figure 10:
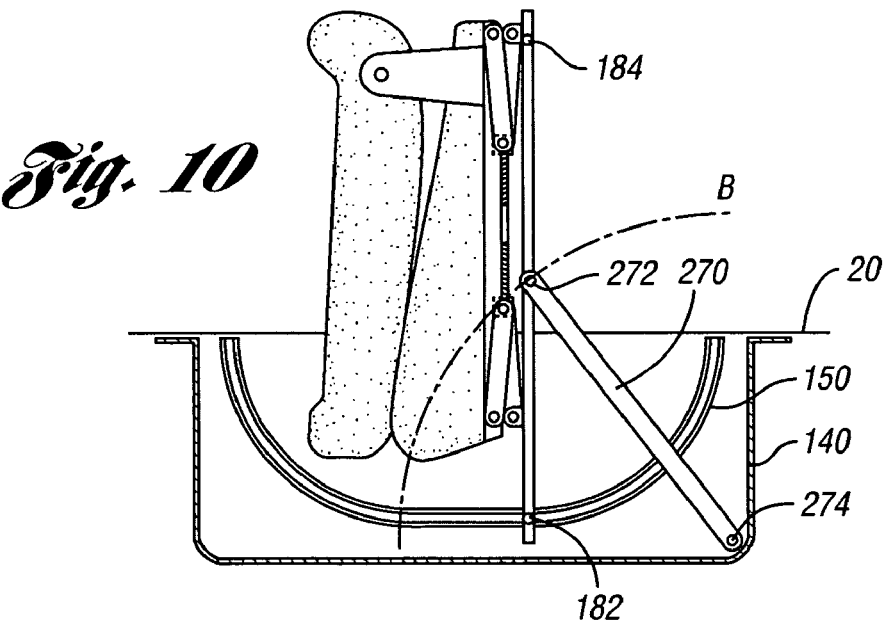
FIG. 10 is the side view of FIGS. 7 and 9, with the assembly further rotated toward the storage position.
Figure 11:
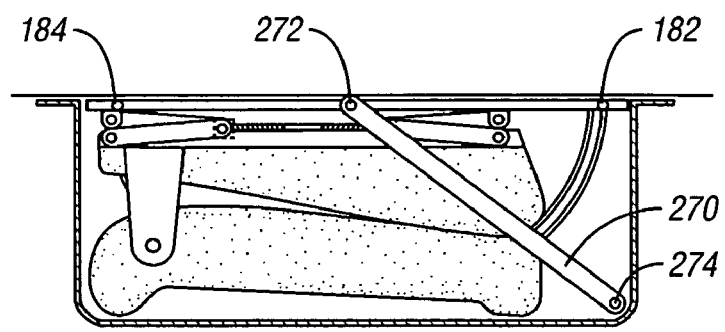
FIG. 11 is the side view of FIGS. 7, 9 and 10, with the assembly in the storage position.

Articulating arm 270 according to the further embodiment of the invention is mounted in a remote corner of receptacle 140, compared to arm 170 mounted inside of track 150. In order to avoid interference with pin/roller 182 as it traverses guide track 150, articulating arm 270 is positioned outwardly of guide track 150, as shown in FIG. 8.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A vehicle storage assembly comprising:
    a receptacle having a side wall, a lower extent, and an open upper extent contiguous with a floor surface within the vehicle;
    a guide track associated with the side wall;
    a cover adapted to occupy the open upper extent of the receptacle, the cover incorporating a guide pin adapted to engage the guide track for moving the cover between a first closed position and a second inverted position; and
    a guide arm connected to the receptacle and pivotally connected to the cover, wherein the guide arm is pivotally connected to the receptacle at a base pivot and to the cover at a floating pivot.

2. The assembly of claim 1, wherein the floating pivot is symmetrically located on the cover.

3. The assembly of claim 1, wherein the base pivot is above the guide track.

4. A vehicle storage assembly comprising:
    a receptacle having a side wall, a lower extent, and an open upper extent contiguous with a floor surface within the vehicle;
    a guide track associated with the side wall, wherein the track includes an arcuate section and a straight section;
    a cover adapted to occupy the open upper extent of the receptacle, the cover incorporating a guide pin adapted to engage the guide track for moving the cover between a first closed position and a second inverted position; and
    a guide arm connected to the receptacle and pivotally connected to the cover.

5. The assembly of claim 4, wherein the guide arm is connected to the receptacle at a base pivot and the arcuate section has a radius of curvature defined by a distance from the base pivot to the guide pin.

6. The assembly of claim 4, wherein the straight section is parallel to the lower extent of the receptacle.

7. The assembly of claim 4, wherein the cover fully occupies the open upper extent in both the first closed position and the second inverted position.

* * * * *